United States Patent
Qin et al.

(10) Patent No.: US 10,414,270 B2
(45) Date of Patent: Sep. 17, 2019

(54) METHOD FOR OPENING A REFUELING DOOR OF A VEHICLE AND A REFUELING DOOR ASSEMBLY

(71) Applicant: Ford Global Technologies, LLC, Dearborn, MI (US)

(72) Inventors: Charles Qin, Nanjing (CN); Russell Randall Pearce, Ann Arbor, MI (US); Neil Wu, Nanjing (CN); Le Hong, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 160 days.

(21) Appl. No.: 15/668,516

(22) Filed: Aug. 3, 2017

(65) Prior Publication Data

US 2018/0050587 A1    Feb. 22, 2018

(30) Foreign Application Priority Data

Aug. 22, 2016 (CN) .......................... 2016 1 0702289

(51) Int. Cl.
*B60K 15/05* (2006.01)
*B60K 15/03* (2006.01)
*B60K 15/035* (2006.01)

(52) U.S. Cl.
CPC ...... *B60K 15/05* (2013.01); *B60K 2015/0321* (2013.01); *B60K 2015/03203* (2013.01); *B60K 2015/03576* (2013.01); *B60K 2015/0538* (2013.01)

(58) Field of Classification Search
CPC ...... B60K 15/05; B60K 15/03; B60K 15/035; B60K 2015/03203; B60K 2015/0321; B60K 2015/03576

USPC ................................................. 296/97.22
See application file for complete search history.

(56) References Cited

U.S. PATENT DOCUMENTS

| 5,924,757 | A | 7/1999 | Stapf |
| 6,260,544 | B1* | 7/2001 | Spry ............... B60K 15/03504 123/516 |
| 6,702,357 | B2 | 3/2004 | Joerg et al. |
| 8,000,856 | B2 | 8/2011 | Larsen et al. |

(Continued)

FOREIGN PATENT DOCUMENTS

| CN | 1706683 A | 12/2005 |
| DE | 102007035492 A1 | 1/2009 |

(Continued)

*Primary Examiner* — Hilary L Gutman
(74) *Attorney, Agent, or Firm* — Julia Voutyras; Kolitch Romano LLP

(57) ABSTRACT

The present disclosure provides a method for opening a refueling door of a vehicle. The method comprises adjusting a speed of opening the refueling door based on a fuel tank vapor pressure in response to a detected refueling request. Another aspect of the present disclosure provides a refueling door assembly for a vehicle. The refueling door assembly comprises a fuel tank; a refueling inlet to receive a fuel dispensing nozzle; a fuel fill line coupled between the fuel tank and the refueling inlet; a refueling door located at a vehicle body; an operating mechanism connected to the refueling door to open and close the refueling door; and a control module configured to open the refueling door responsive to a refueling request and control an opening speed of the operating mechanism based on a fuel tank vapor pressure.

20 Claims, 9 Drawing Sheets

(56) References Cited

U.S. PATENT DOCUMENTS

| | | | |
|---|---|---|---|
| 9,216,646 B2 | 12/2015 | Yang et al. | |
| 9,758,033 B1* | 9/2017 | Haberman | B67D 7/42 |
| 9,834,205 B1* | 12/2017 | Dudar | B60W 20/50 |
| 2002/0008402 A1* | 1/2002 | Moll | B60K 15/05 |
| | | | 296/97.22 |
| 2009/0216400 A1* | 8/2009 | Larsen | B60K 15/05 |
| | | | 701/30.7 |
| 2015/0183316 A1* | 7/2015 | Wakamatsu | B60K 15/05 |
| | | | 340/426.24 |
| 2015/0306953 A1 | 10/2015 | Dudar et al. | |
| 2015/0337569 A1* | 11/2015 | Lim | E05B 83/34 |
| | | | 292/197 |
| 2016/0068062 A1* | 3/2016 | Aso | B60K 15/04 |
| | | | 220/86.2 |
| 2016/0221436 A1* | 8/2016 | Lindlbauer | B60K 15/05 |
| 2017/0174074 A1* | 6/2017 | Wakamatsu | B60K 15/03504 |
| 2017/0292477 A1* | 10/2017 | Kimoto | F02M 37/00 |
| 2017/0326982 A1* | 11/2017 | Williams | B60K 35/00 |
| 2018/0072152 A1* | 3/2018 | Dudar | B60K 15/03504 |
| 2018/0072556 A1* | 3/2018 | Dudar | B67D 7/145 |
| 2018/0135342 A1* | 5/2018 | Pearce | E05D 11/10 |

FOREIGN PATENT DOCUMENTS

| | | | | |
|---|---|---|---|---|
| EP | 1785307 A1 | 5/2007 | | |
| WO | WO-2019042903 A1 * | 3/2019 | | B60K 15/03504 |

\* cited by examiner

METHOD FOR OPENING A REFUELING DOOR OF A VEHICLE AND A REFUELING DOOR ASSEMBLY

RELATED APPLICATION

This application claims the benefit of Chinese Patent Application No.: CN 201610702289.0, filed Aug. 22, 2016; the entire contents thereof being incorporated herein by reference.

FIELD

The present disclosure generally relates to a refueling door assembly and a method for operating the same, particularly a refueling door assembly of hybrid vehicles and a method for operating the same.

BACKGROUND

Fuel propelled vehicles and hybrid vehicles having engines usually include a refueling opening at the body; and a user opens a refueling door to refuel the fuel tank via the refueling opening. Fuel in the fuel tank generates fuel vapor. For hybrid vehicles, the fuel tank may not be opened for a long time or fuel vapor will not be purged for a long duration. Therefore, fuel vapor pressure may be built up in the fuel tank and depressurizing is needed to reduce the vapor pressure in the fuel tank before the refueling door is opened.

The inventors of the present disclosure have recognized that, if the refueling door opens only upon the confirmation of depressurizing in the fuel tank being completed, there may be a time difference between the time of a request to open the refueling door and the actual time of opening the refueling door and may cause confusion to a user. For example, the user may repeatedly press a switch for the refueling door because he or she is not sure if the switch works and may feel frustrated due to the efforts needed to open the refueling door.

SUMMARY

According to one aspect of the present disclosure, a method for opening a refueling door of a vehicle is provided. The method may comprise: responsive to a detected refueling request, and adjusting a speed of opening the refueling door based on a fuel tank vapor pressure.

In one embodiment, the method may comprise starting to open the refueling door responsive to the detected refueling request. The refueling request may be issued by activating an actuator in an interior f the vehicle or an exterior of the vehicle.

In another embodiment, the method may further comprise determining the fuel tank vapor pressure P via estimation or measurement by a sensor.

In another embodiment, the method may further comprise comparing the fuel tank vapor pressure P with a threshold pressure Ps, and instructing to depressurizing the fuel tank if P is greater than the threshold pressure Ps.

In another embodiment, wherein depressurizing the fuel tank may comprise instructing to open a valve communicating with the fuel tank to release the fuel vapor through a predetermined path.

In another embodiment, the method may further comprise comparing the fuel tank pressure P with the threshold pressure Ps, and opening the refueling door at a first speed if P is greater than Ps, and opening the refueling door at a second speed if P is not greater than Ps, wherein the first speed is lower than the second speed.

In another embodiment, the method may further comprise comparing the fuel tank vapor pressure P and the threshold pressure Ps; calculating a time T required to depressurize the fuel tank to a pressure below the threshold pressure Ps if P is greater than the threshold Ps; controlling the speed of opening the refueling door so that the refueling door opens completely at a time greater or equals to time T; controlling the speed of opening the refueling door so that the refueling, door opens completely at a time Tf if pressure P is lower than or equals to the threshold Ps, wherein the time Tf is a predetermined time to completely open the refueling door.

In another embodiment, the vehicle may comprise an actuator located on an exterior of the vehicle to unlock the refueling door, and the method may further comprise: comparing the fuel tank vapor pressure P with the threshold pressure Ps; calculating a time T1 required to decrease the fuel tank pressure P to below the threshold Ps if pressure P is greater than the threshold pressure Ps; calculating a time T2 taken from depressurizing begins to a time when unlocking the actuator of the refueling door is detected, and controlling the speed of opening the refueling door so that the refueling door opens completely at a time greater or equals to time T1−T2 if T1−T2>=Tf; controlling the speed of opening the refueling door so that the refueling door opens completely at a time greater or equals to time Tf if T1−T2<Tf. The time Tf is a predetermined time for completely open the refueling door.

In another embodiment, unlocking of the actuator of refueling door may be detected via a control module. In one or more examples, Tf may be predefined to be three to five seconds.

According to another aspect of the present disclosure, a refueling door assembly for a vehicle is provided. The refueling door assembly may comprise: a fuel tank; a refueling inlet to receive a fuel dispensing nozzle; a fuel fill line coupled between the fuel tank and the refueling inlet; a refueling door located at a vehicle body; an operating mechanism connected to the refueling door to open and close the refueling door; and a control module configured to open the refueling door responsive to a refueling request and control an opening speed of the operating mechanism based on a fuel tank vapor pressure.

In another embodiment, the refueling request may include a refueling request issued from an actuator located on an interior and/or an exterior of the vehicle.

In another embodiment, the refueling door assembly may further comprise a sealing cover located in the refueling inlet to seal the refueling inlet. The sealing cover may be connected to a wall of the fuel fill line via threads or an offsetting spring.

In another embodiment, the operating mechanism may comprise a supporting arm. The supporting arm may have a first end and a second end, and the first end may be connected to the refueling door and the second end may be pivotably connected to the vehicle body; and a motor drivably connected to the second end.

In another embodiment, the motor may comprise an output shaft, and the second end of the supporting arm may include a sleeve operably connected to the output shaft.

In another embodiment, the motor may comprise an output gear, and the second end of the supporting arm may include a toothed surface to engage the output gear.

In another embodiment, the operating mechanism may comprise a supporting arm, and the supporting arm may include a first end and a second end. The first end may be connected with the refueling door, and the second end may be pivotably connected to the vehicle body. The second end may include a first sector and a second sector having different sizes. The operating mechanism may further comprise a first gear and a second gear connected to the vehicle body, the first and second gears may have different radius and match the first and the second sector, respectively. The first and second gears may further be connected to a driving device and be slidably supported on a supporting shaft via the driving device.

In another embodiment, the driving device may comprise a motor or an electromagnet.

In another embodiment, the vehicle control module may be configured to receive a signal of the fuel tank vapor pressure and to calculate time required to depressurize the fuel tank to a pressure below a threshold.

In another embodiment, the vehicle control module may be connected to a fuel vapor recovery path and be configured to open a fuel vapor purge valve upon determination that the fuel tank vapor pressure may be greater than the threshold and purge the fuel vapor to the fuel vapor recovery path, wherein the fuel vapor recovery path may comprise a carbon canister.

According to another aspect of the present disclosure, a method to open a refueling door of a fuel tank in a vehicle is provided. The method may comprise: responsive to a refueling request, determining a fuel vapor pressure P in the fuel tank; and starting to open the refueling door upon receiving the refueling request; and controlling a speed of opening the refueling door based on the fuel vapor pressure P.

In another embodiment, opening the refueling door may comprise a fast opening mode and a slow opening mode, the method may further comprise comparing the fuel vapor pressure P with a threshold pressure Ps, and executing the slow opening mode to open the refueling door if P is greater than Ps; and adopting the fast opening mode to open the refueling door is P is not greater than Ps.

In another embodiment, the vehicle may comprise an operating mechanism connected with the refueling door to open and to close the refueling door. The operating mechanism may comprise a first gear set for the fast opening mode and a second gear set for the slow opening mode, wherein executing the fast opening mode to open the refueling door may include engaging the first gear set to open the refueling door, and executing the slow opening mode includes engaging the second gear set to open the refueling door.

In another embodiment, the method may further comprise, during the process of opening the refueling door, depressurizing the fuel tank through opening a valve in a fuel vapor recovery path.

In another embodiment, the fast and the slow opening modes may be configured to enable that the fuel tank is depressurized to a predetermined value when the refueling door is opened completely.

In another embodiment, the vehicle may comprise an operating mechanism connected with the refueling door to open and to close the refueling door, and the operating mechanism may comprise a motor. Controlling the opening speed of the refueling door includes controlling a speed of the motor. The speed of the motor may be controlled such that when the refueling door is opened completely; the pressure of the fuel tank is decreased to a predetermined value.

The method and assembly of the present disclosure control an opening speed of a refueling door or time to completely open the refueling door so that on one hand fuel vapor pressure may be released before opening the refueling door, on the other hand the user may notice that the refueling door is opening. Users will not repeat pressing the switch or simply think that the fuel system is malfunctioning.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

One or more advantageous features as described herein elsewhere will be readily apparent from the following detailed description of embodiments when taken in connection with the accompanying drawings.

BRIEF DESCRIPTION OF THE DRAWINGS

For complete understanding of one or more embodiments of this invention, reference should be made to the embodiments illustrated in greater detail in the accompanying drawings and described below by way of examples.

Figure 1:
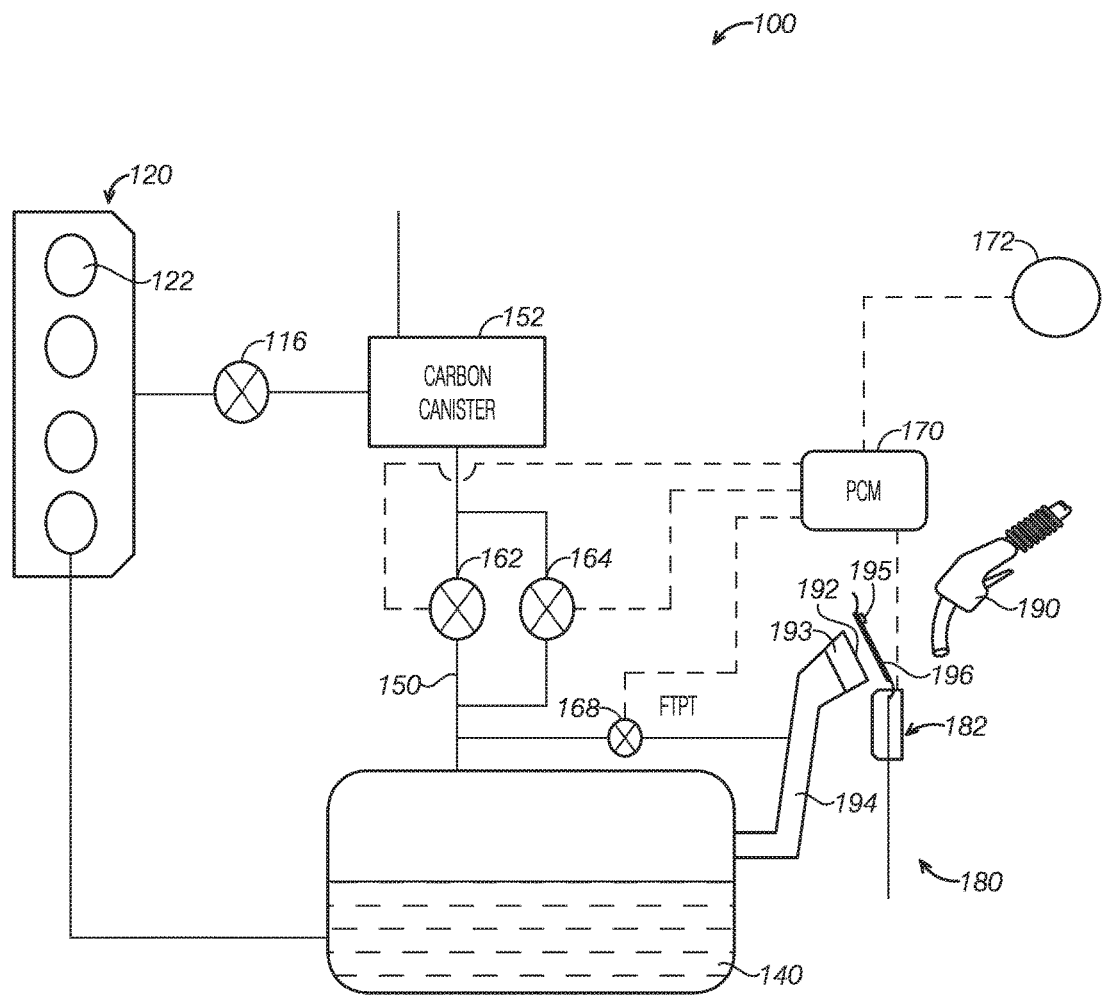
FIG. 1 schematically depicts a vehicle fuel system according to one or more embodiments of the present disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

As required, detailed embodiments of the present invention are disclosed herein; however, it should be understood that the disclosed embodiments are merely examples of the invention that may be implemented in various and alternative forms. The figures are not necessarily drawn in scale; some features may be exaggerated or minimized to show details of particular components. As referenced in the figures, the same or similar reference numerals are used to refer to the same or similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to implement the present invention in various manners.

A fuel tank in vehicles including hybrid vehicles may generate more fuel vapor at certain circumstances, for example during refueling events or under high ambient temperatures. For hybrid vehicles, fuel tank may not be used for a long time, or fuel tank vapor may not be purged for a long duration, thereby fuel tank vapor pressure may be built up. Postponing refueling door opening to depressurize the fuel tank may cause problems as described in the background. One or more embodiments of the present application provide refueling door assemblies and controlling methods thereof to at least address some of the problems.

FIG. 1 schematically depicts a vehicle fuel system 100 according to one or more embodiments of the present disclosure. In one or more non-limiting examples, the vehicle fuel system 100 may include an engine 120 having multiple cylinders 122. The engine 120 may be connected to a fuel tank 140 and fuel may be delivered to engine 120 via one or more pumps. In some examples, the fuel system 100 may include a fuel vapor recovery system. The fuel vapor recovery system a include a fuel vapor recovery line 150 and a carbon canister 152. Vapor produced in the tank 140 may be routed to the fuel vapor recovery line 150 and be absorbed by the carbon canister 152. One or more fuel vapor valves 162, 164 may be arranged in the fuel vapor recovery line 150 to selectively disconnect or connect the fuel tank 140 to recover fuel vapor. Moreover, the canister 152 may be connected to the engine 120 via a canister purge valve 116 such that the recovered fuel vapor may be purged or recirculated to engine 120 for combustion. In some embodiments, the canister purge valve 116 may be a selectively opened solenoid valve. In some embodiments, the canister purge valve 116 may be a normally opened valve and a purge rate may be regulated by the fuel vapor valves 162 and 164 upstream of the canister 152. The other end of the canister 152 may be communicating with atmosphere so that filtered air may be released to the environment. Among other functions, fuel vapor valves 162, 164 may allow a fuel vapor canister 152 to be maintained at a low pressure without increasing the fuel evaporation rate from the fuel tank 140, which would otherwise occur if the fuel tank 140 pressure was lowered. In some examples, fuel vapor valves 162, 164 of the fuel vapor recovery line 150 are configured to allow different vapor flowing rate, and fuel vapor recovery under different vapor pressures may be allowed by opening different valves. It should be appreciated that, the number of valves 162 and 164 may vary, for instance one valve or more than two valves may be provided. Although the valves are shown in the fuel vapor recovery line 150, it should be understood that valves may be at different locations, for instance it may be integrated with the canister 152.

The vehicle may further include a control module 170. And the control module 170 may obtain information from one or more sensors such as exhaust sensors, temperature sensor, and pressure sensors for example. The control module 170 may process the obtained information and trigger a series of actuators based on predefined routines/instructions. The control module 170 may be configured to include instructions or routines stored in memory that may be performed via actuators based on the obtained information from the sensors.

Continuing with FIG. 1, in one or more non-limiting examples, the vehicle may include a refueling door assembly 180 that may open at a speed based on the fuel tank vapor pressure. The refueling door assembly 180 may include a fuel tank 140; a refueling inlet 192 to receive a fuel dispensing nozzle 190; a seal 193 to seal the refueling inlet 192; a fuel fill line 194 coupled between the fuel tank 140 and the refueling inlet 192; an operating mechanism 182 connected to the refueling door 196 to open and close the refueling door 196; and a control module 170. The control module 170 may be configured to start to open the refueling door 196 responsive to a refueling request and control an opening speed of the operating mechanism 182 based on a fuel tank vapor pressure. The seal 193 may be connected to a wall of the fuel fill line 194 via threads or offsetting spring such that the refueling inlet 192 is closed. That is, the fuel tank 140 is isolated from the atmosphere. The refueling door 196 may normally be locked to avoid unauthorized fueling to the fuel tank 140 or drawing fuel from the tank 140. The refueling request may be issued via various manners. In some embodiments, the refueling request may be sent when a user presses an electronic button 172 or triggers a mechanical switch to open the refueling door 196. In other embodiments, a user may trigger a switch at an exterior portion of the vehicle to open the refueling door 196. In one or more examples, the refueling door 196 opening may be completed upon instructions from an interior of the vehicle and unlocking from exterior of the vehicle. In other words, the refueling door 196 may be opened upon a refueling request triggered by a user pressing the electronic button 172 inside the vehicle and then actuate the unlock switch 195 at the exterior of the vehicle. In the examples described above, the signals may be sent to the control module 170. When the control module 170 receives the refueling request, the vehicle control system for instance the control module 170 itself may further receive a fuel vapor pressure of the fuel tank 140, which may be obtained from the fuel tank pressure transducer FTPT 168. Moreover, the control module 170 may instruct to open the refueling door 196 based on the fuel tank pressure and control the opening speed of the operating mechanism 182. Embodiments of the operating mechanism 182 and the control method may be discussed further with reference to the drawings.

Figure 2:
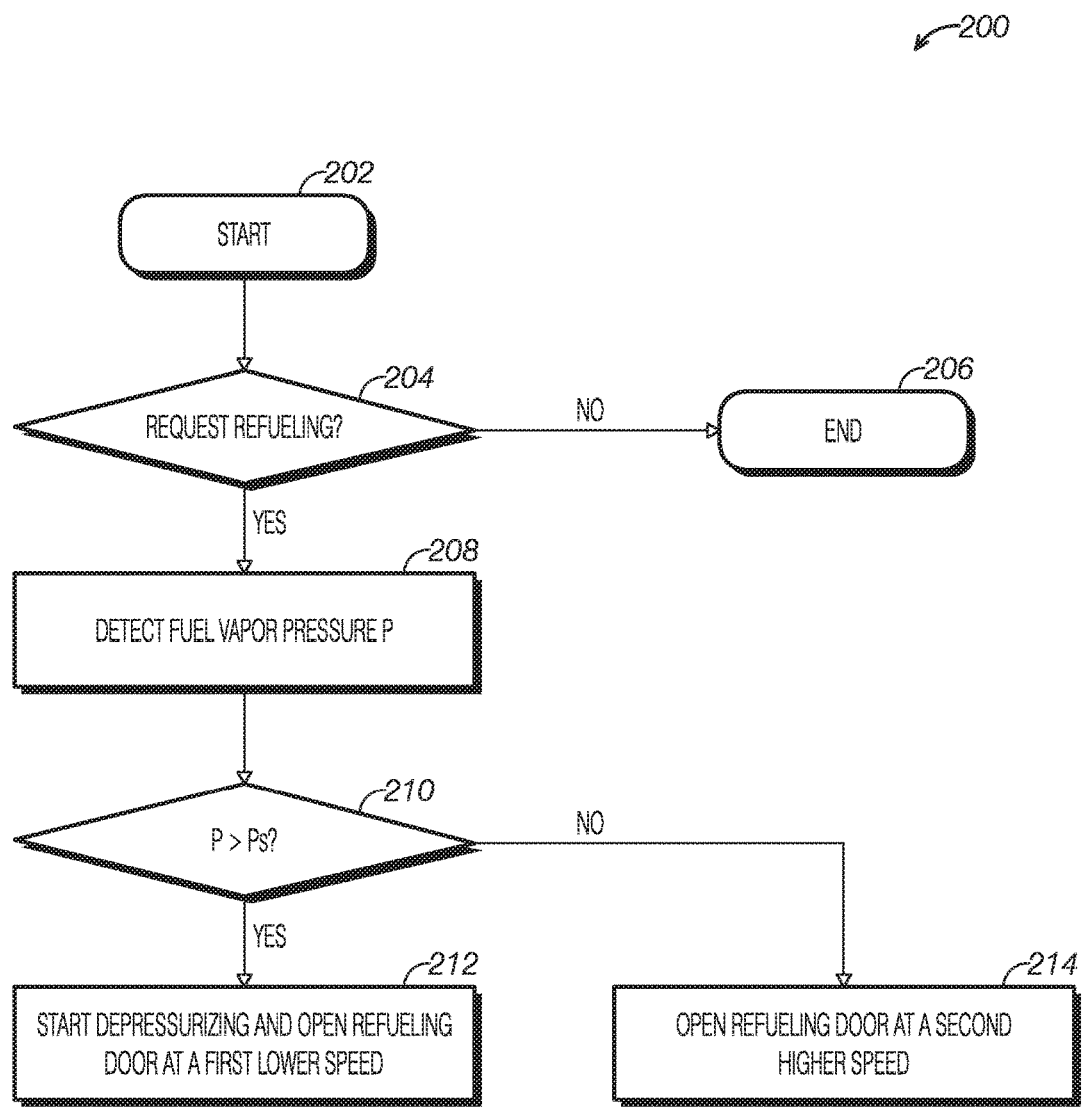
FIG. 2 shows a flowchart of an example method to operate a vehicle refueling door according to one or more embodiments of the present disclosure.

Refer to FIG. 2, an example method 200 to open the vehicle refueling door 196 according to one or more examples of the present invention is described. At 202, the method 200 starts. At 204, the method 200 may include determining if there is a refueling request. The refueling request may be triggered by a user. In the embodiment where an electronic button is provided in the vehicle, pressing the button may trigger a refueling request. Alternatively, other forms of triggering a request may be possible. For example, a mechanical lock may be actuated. In one example, the signal indicating request for opening the refueling door 196 may be transmitted to the control module 170. If it is determined that there is no refueling request, the method 200 may end at 206. If it is determined that there is a request for refueling, the method proceeds to 208. At 208, the method 200 may include determining the fuel tank vapor pressure P. In some embodiments, the FTPT 168 may be used to determine the vapor pressure P in the fuel tank 140. Other sensors or signals may be used to detect or estimate the fuel tank vapor pressure P. At 210, the method may include comparing the vapor pressure P to a threshold pressure Ps. The threshold pressure Ps may be predetermined and stored in a memory of the vehicle control module 170. If the fuel tank vapor pressure P is above the threshold Ps, the method may proceed to the next step 212. At 212, method 200 may include starting to depressurize and opening the refueling door 196 at a first, relatively smaller speed. In some embodiments, depressing the fuel tank may be performed via the fuel vapor recovery system or adjust a valve in the fuel vapor recovery line. The first smaller speed may be set such that the vapor pressure P is decreased to be or lower than the threshold pressure Ps when the refueling door 196 is completely opened or is opened to a position where the fuel dispensing nozzle 190 may be inserted into the refueling inlet 192. If it is determined that the vapor pressure P is not greater than the threshold pressure Ps at 212, the method 200 will proceed to 214 and the refueling door 196 may be opened at a second greater speed.

Figure 3:
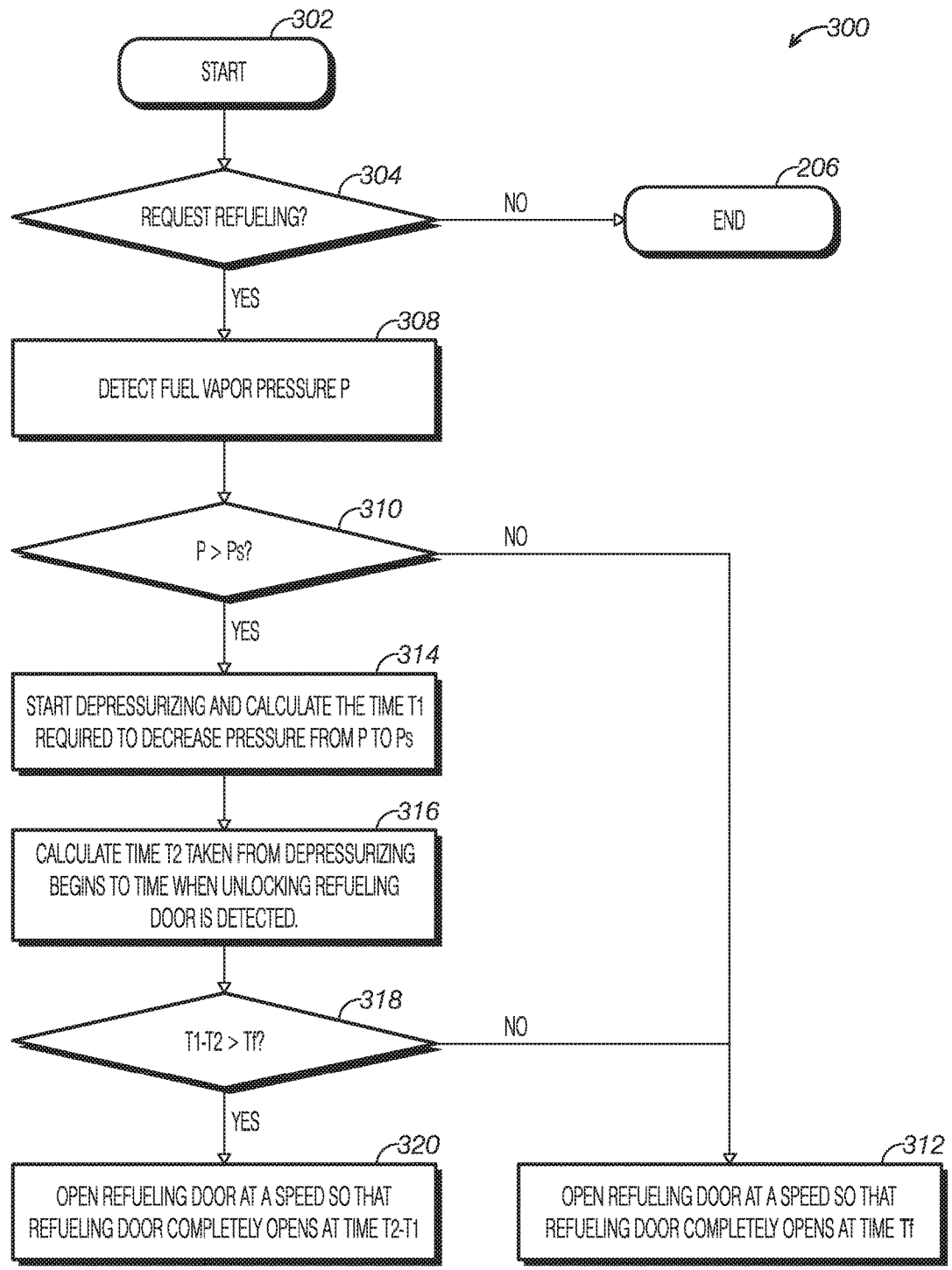
FIG. 3 shows a flowchart of an example method to open a vehicle refueling door according to another one or more embodiments of the present disclosure.

Referring to FIG. 3, FIG. 3 is a flowchart to illustrate a method 300 to operate a vehicle refueling door according to one or more examples of the present disclosure. At 302, method 300 starts. At 304, the method 300 includes determining if there is a request for refueling. The request for refueling may be initiated by a user. The refueling request may include triggering an actuator such as an electric lock or mechanical lock inside or outside the vehicle. The method 300 ends at 306 if it is determined that there is no refueling request. If a refueling request is detected, method 300 proceeds to the next step 308. At 308, method 300 includes determining a fuel tank vapor pressure P. In some embodiments, the vapor pressure P inside the fuel tank 150 may be detected via the FTPT sensor 168. In other embodiments, the fuel tank vapor pressure P may be detected by other sensors or estimated as appropriate. At 310, the method 300 may include comparing the vapor pressure P to a threshold value Ps. The threshold value Ps may be predetermined and stored in a memory of the vehicle control module 170. If the vapor pressure P is greater than the threshold Ps, the method 300 proceeds to step 314 and starts to depressurize the fuel tank and calculate time T1 required to decrease the vapor pressure P to a pressure below the threshold Ps. In one or more non-limiting embodiments, the user may trigger the refueling request inside the vehicle. In other embodiments, the user may have to activate an unlock switch 195 to unlock the refueling door 196. If it may take time T2 from the moment to start depressurizing to activate an unlock switch 195, and it may take time T1 to depressurize the fuel tank to Ps, a user may wait for time (T1−T2) until the vapor pressure in the fuel tank is decreased to a pressure lower than Ps when the user is outside the vehicle. Therefore, the opening speed of the refueling door may be calculated based on the duration of time (T1−T2). For example, if it may take 4 seconds to depressurize (that is to decrease vapor pressure P to a pressure lower than threshold Ps), while it takes 3 seconds for the user to get off the vehicle to activate the unlock switch. The user actually has to wait for 1 second (i.e., 4 seconds minus 3 seconds). In some embodiments, the refueling door 196 is controlled to be opened in 1 second. In other embodiments, the method 300 proceeds to the next step 318. A shortest time Tf to open the refueling door 196 may be set and the difference of (T1−T2) may be compared with Tf. If (T1−T2) is less than Tf, the refueling door 196 may be fully opened at a time Tf. In this manner, the refueling door may not open too fast to cause the user's concern on the door malfunctioning. Further, it may be beneficial to the life cycle of the refueling door 196 and operating mechanism 182 when the refueling door opens at appropriate speed. If T1−T2 is greater than Tf, the opening speed of the refueling door 196 may be controlled such that the refueling door 196 may be fully opened at time T1−T2. Referring to step 310, if the pressure P is not greater than Ps, the refueling door 196 may be opened fully at a time Tf.

In the foregoing or following description, opening the refueling door 196 at time (T1−T2) or Tf refers to that it will take time (T1−T2) or Tf to fully open the refueling door 196, and the opening speed of the refueling door 196 may be defined as full travel distance/(T1−12) or full travel distance/Tf. The term "fully open" refer to a designed largest possible opening position, or it may include a position before a final fully opened position but the user may insert a refueling gun (or it may be referred to as a dispensing nozzle). In the above referenced examples, when the fuel tank requires depressurizing, the opening speed of the refueling door may be relatively smaller so that there's sufficient time to complete depressurizing. When depressurizing is not needed, the opening speed may be relatively greater. In other embodiment, if the time required for depressurizing T1 is lower than the time T2 taken from depressurizing starts to unlock of the refueling door 196, then the refueling door 196 may be opened at a relative fast speed as well.

It should be appreciated that the example method may be modified as necessary. For example, one or more steps may be arranged in other appropriate forms within the spirit of the present invention. For example, vapor pressure may be detected after the refueling request is identified, and depressurizing may start once it is determined that the detected pressure is greater than the threshold. Subsequently the time required for depressurizing may be calculated and then the refueling door may be opened at a certain speed. As information processing of the control module is very fast and the sequence of the steps may not substantially impact the responding speed of the refueling door and thus may not be noticeable to the users. In the above referenced example, the step of starting to depressurize and opening the refueling door 196 at a first speed may be carried out simultaneously.

In one or more non-limiting examples as described above or elsewhere, the refueling door 196 may start to open upon the refueling request regardless of the fuel tank vapor pressure while the opening speed of the refueling door 196 may be controlled so that the time for the refueling door 196 opened fully varies with the fuel tank vapor pressure. In the circumstance where the fuel tank vapor pressure is large, the refueling door 196 may start to open upon a refueling request. Thus, users or operators at the refueling station may notice the opening refueling door and will not repeatedly press the unlocking button or erroneously judge that the refueling door opening mechanism is malfunctioning. At the sa e, fuel tank vapor pressure can be decreased to a pressure below the threshold. More detailed structure of the refueling door 196 and operating mechanism 182 will be described below.

Figure 4:
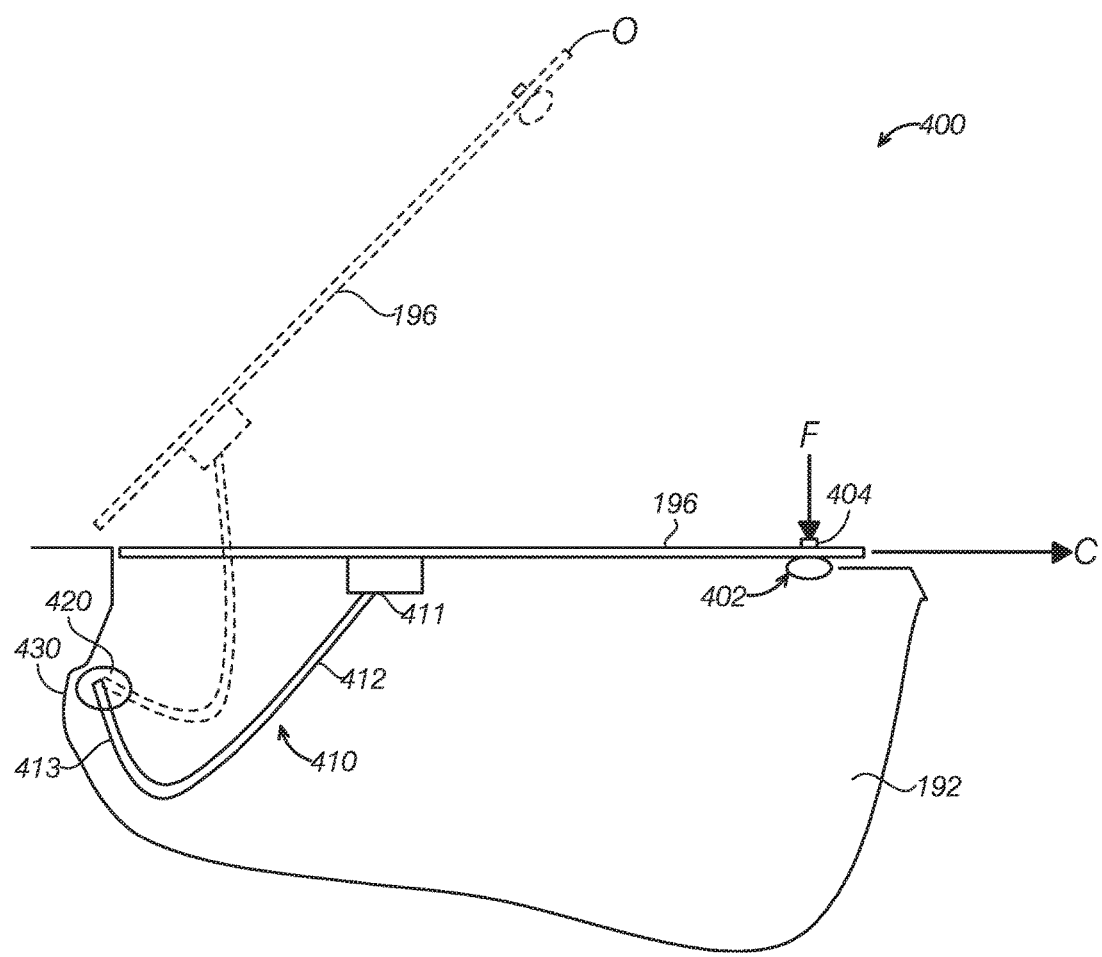
FIG. 4 schematically depicts an operating mechanism of a refueling door according to one or more embodiments of the present disclosure.

Referring to FIG. 4, a refueling door assembly 400 according to one or more embodiment of the present disclosure is illustrated. In one or more embodiments, the refueling door assembly 400 may include a refueling inlet 192 and a refueling door 196 to cover the refueling inlet 192. The refueling door 196 moves between a closed position C and an opening position O (dotted portion) via an operating mechanism 410 pivotably connected to the vehicle body 430, which performs the closing and opening of the refueling door 196. The operating mechanism 410 may include a supporting arm 412, and the supporting arm 412 may include a first end 411 and a second end 413. The first end 411 is connected with the refueling door 196, and the second end 413 is pivotably connected to the vehicle body 430. In one or more embodiments, the refueling door 196 may open at a certain speed upon a refueling request. In another example, the refueling door 196 may open at a certain speed only upon a refueling request and unlocking of a lock outside of the vehicle. The refueling door 196 may further include a lock device 402, for example it may be an unlock mechanism with an unlock switch 404. When a force F is exerted on the unlock switch 404, the lock device 402 unlocks to allow the refueling door 196 to open. In one or more embodiments, the signal of unlocking the refueling door 196 may be transmitted to the control module 170.

Figure 5A:
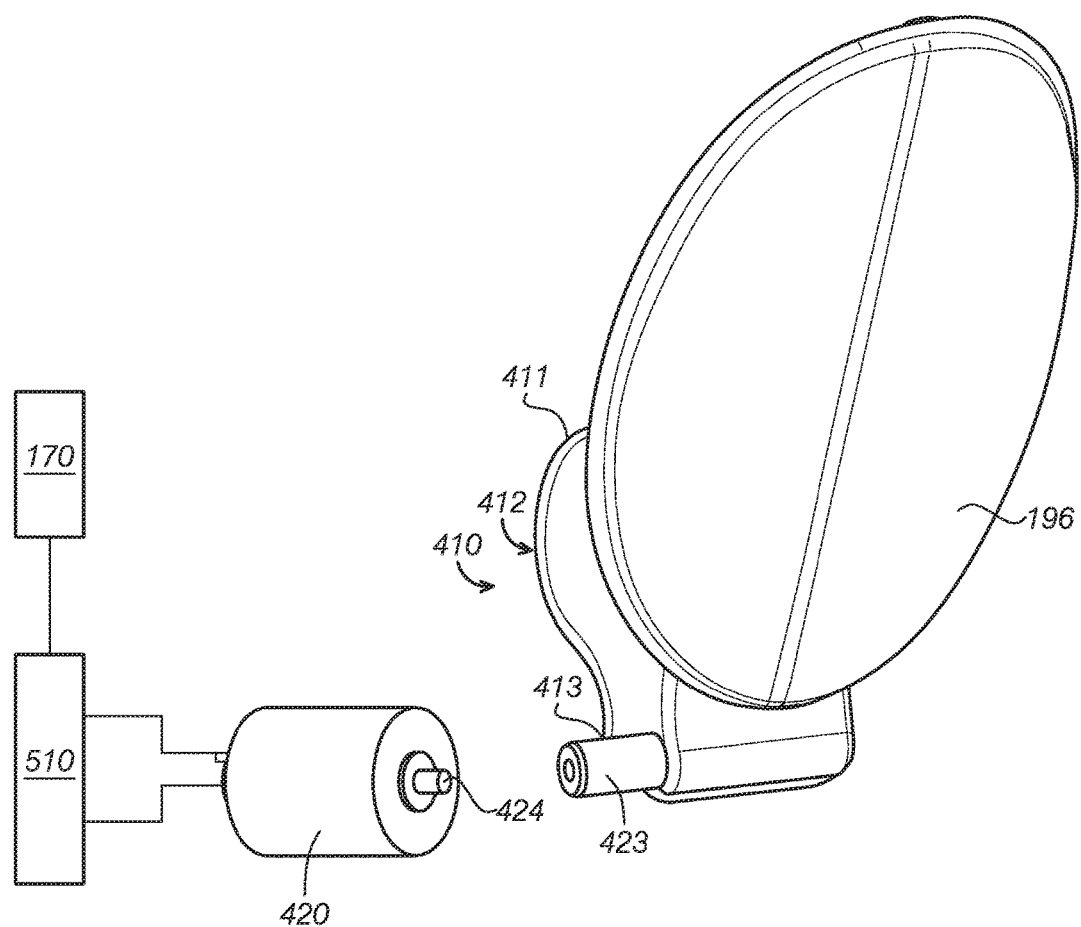
FIG. 5A and FIG. 5B schematically depict two non-limiting examples of the operating mechanism of the refueling door assembly in FIG. 4.
Figure 5B:
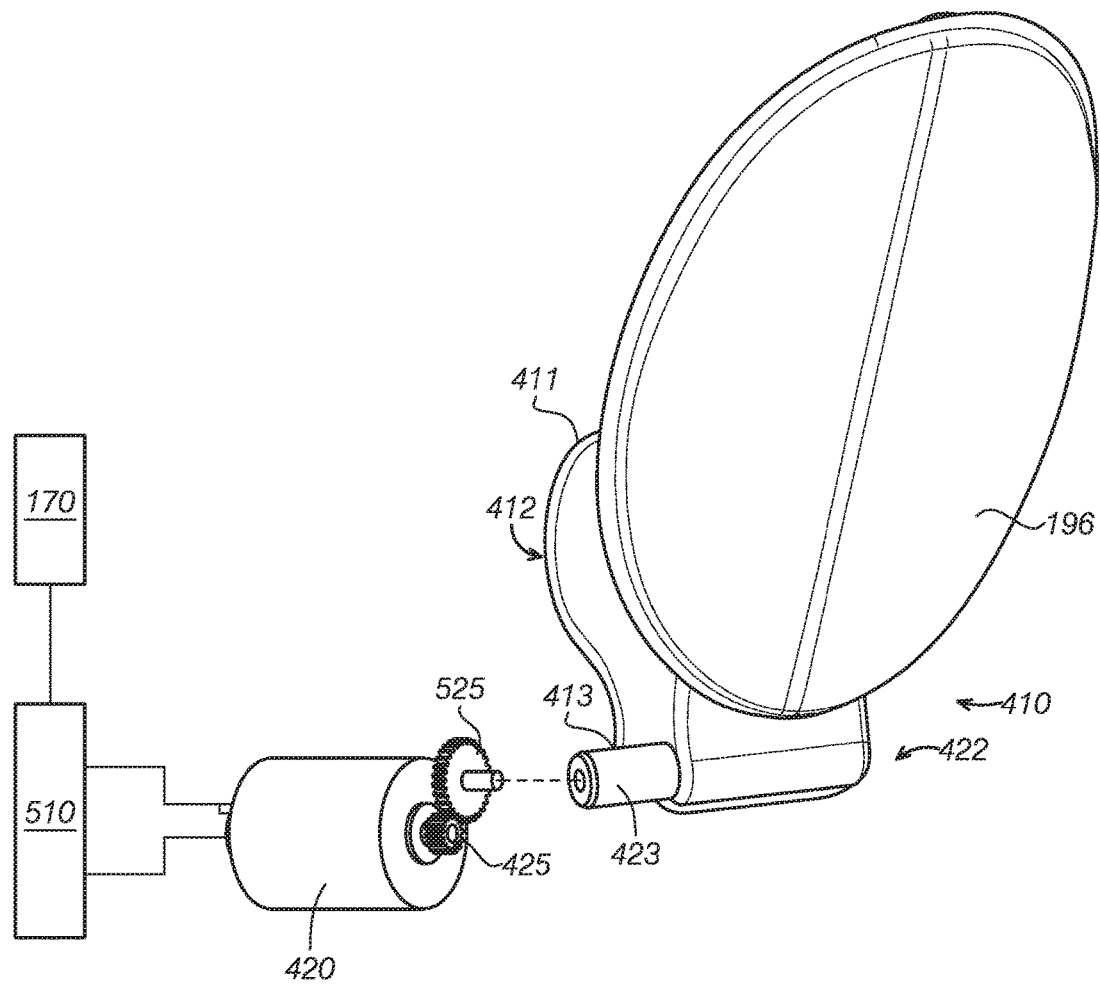

Now referring to FIG. 5A and FIG. 5B, two non-limiting example connections between the motor 420 and the refueling door 196 are illustrated. In the example embodiment shown in FIG. 5A, the motor 420 includes an output shaft 424. The second end 413 of the supporting arm 412 includes a sleeve 423 to be operationally connected to the output shaft 424. The motor 420 is connected to a power source 510. The control module 170 is further connected to the power source 510 to control the voltage and duration of the power supplied to the motor 420 such that the operating speed and duration of the motor 420 may be controlled. Different speed to open the refueling door 196 may be achieved via adjustment of the rotation speed of the motor 420. In one embodiment, intermediate gear or reverse gear set may be arranged between the motor 420 and supporting arm 412 of the operating mechanism 410 to adjust the direction of the motion such that the motor 420 may be positioned in any suitable locations of the vehicle body.

In another embodiment as shown in FIG. 5B, the motor 420 includes an output gear 425. The second end 413 of the supporting arm 412 includes a connector 525 with a toothed surface to engage the output gear 425. The connector 525 with a toothed surface is shown as a gear surface herein but it could be in any suitable forms, for example; sector or rack. The gear structure may adjust the speed transmitted from the motor 420 to the operating mechanism 410 to achieve desired opening speed of the refueling door. In the above example, the control module 170 may obtain fuel vapor pressure data of the fuel tank and calculate the time required to depressurize. Time to fully open the refueling door 196 may be calculated and thus a suitable speed of the motor 420 may be obtained. In some embodiments, current or voltage or duration of power supply may be used to control the motor 420. When refueling is completed, a user may directly close the refueling door 196. In other embodiments, the refueling door 196 may be closed automatically upon detection of unplugging the fuel dispensing nozzle 190 or other likewise signals.

Figure 6:
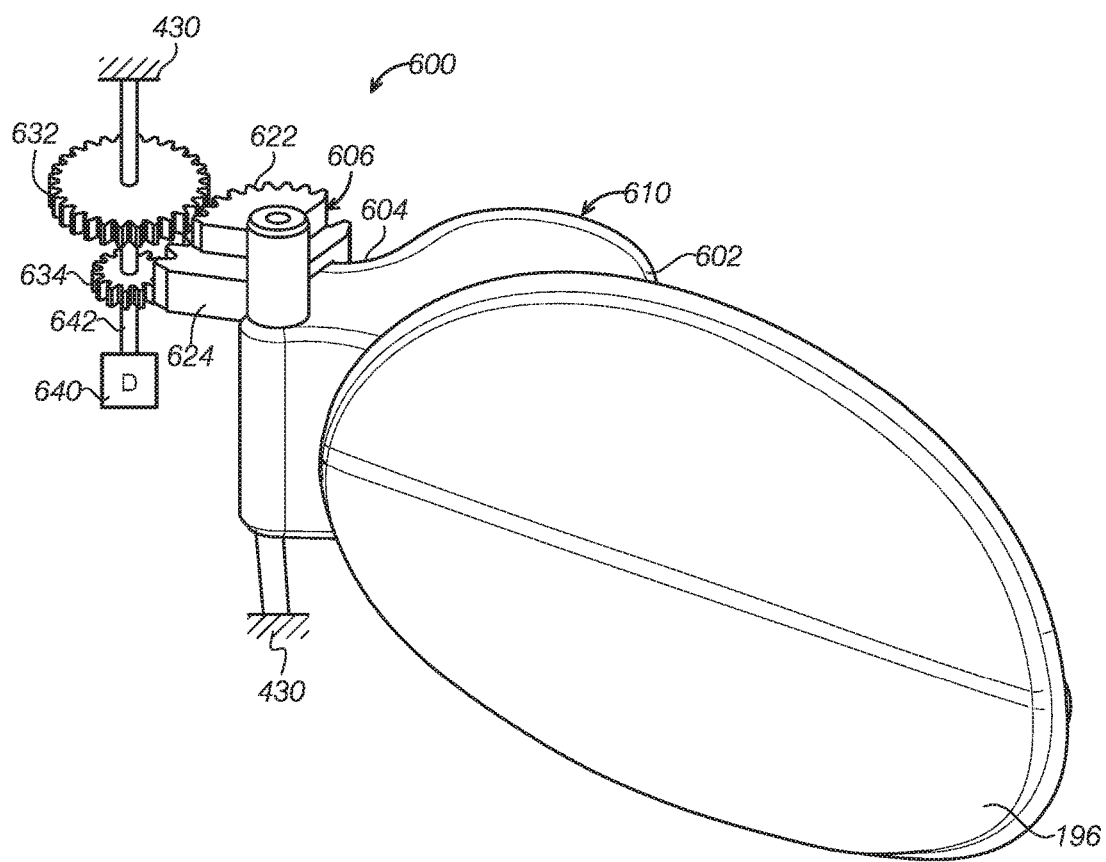
FIG. 6 schematically depicts an operating mechanism for refueling door assembly according to another example embodiment of the present disclosure.

FIG. 6 depicts an operating mechanism 600 of a refueling door assembly according to another embodiment of the present disclosure. The operating mechanism 600 includes a supporting arm 610 having a first end 602 and a second end 604. The first end 602 of the supporting arm 610 is connected to the refueling door 196 and the second end 604 is pivotably connected to a sector device 606 fixed on the vehicle body. The sector device 606 includes a first sector 622 and a second sector 624. The first sector 622 and the second sector 624 may be of different sizes, and the first sector 622 is shown to be smaller than the second sector 624 in the depicted embodiment. The operating mechanism 600 further comprises a first gear 632 and a second gear 634 connected to the vehicle body 430, the first and second gears 632 634 may have different radius matching the first and the second sector 622, 624, respectively, and the first and second gears 622, 624 are further connected to and driven by a driving device 640 and slidably supported on a supporting shaft 642. In some embodiments, the driving device 640 may be a motor or an electromagnet. It should be appreciated that, in the above referenced example, the first and second sectors 622, 624 and the first and second gears 632 and 634 may be executed in other equivalent forms, for instance, gears, racks, ratchets, sectors and other structures that may form a rotatable engagement and disengagement. In one or more embodiments, the first gear set (632 and 622) and the second gear set (634 and 624) may respectively form fast and slow opening modes, where engaging the first gear set (632 and 622) may realize a fast-opening mode and engaging the second gear set (634 and 624) may realize a slow opening mode.

Figure 7A:
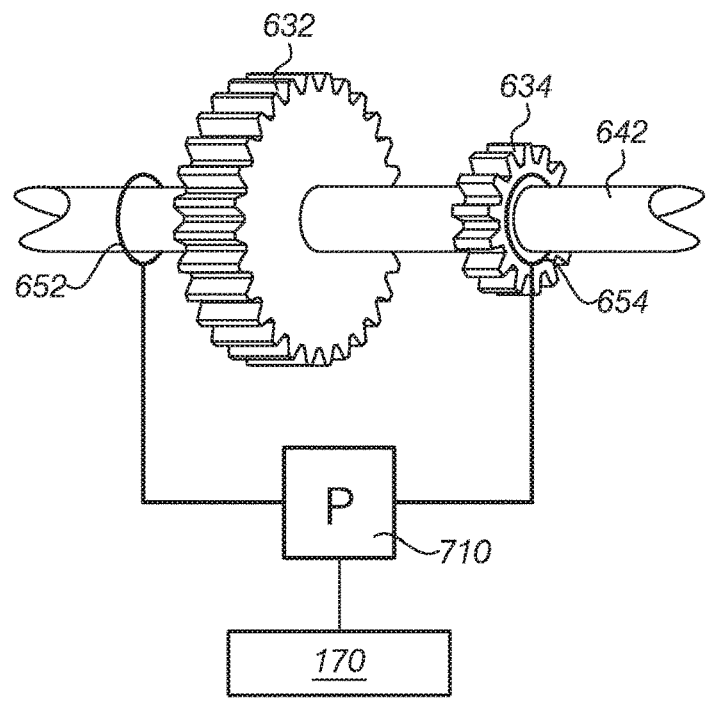
FIG. 7A and FIG. 7B schematically depict an example driving device for the operating mechanism in FIG. 6, illustrating the driving device at different operation states.
Figure 7B:
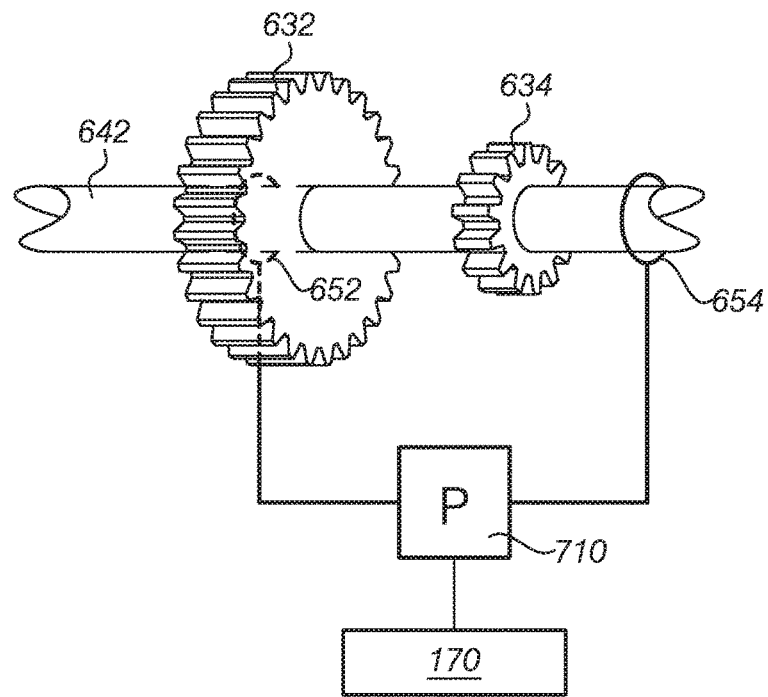

FIG. 7A and FIG. 7B illustratively depict an example of the driving device 640 of the operating mechanism 600, with the driving device 640 being at different working status. As shown in the figures, in this example, the first gear 632 and the second gear 634 are movably connected to the supporting shaft 642. The supporting shaft 642 further includes two electromagnets 652 and 654. The control module 170 controls a power supply to the electromagnets 652 and 654, for example via controlling the power supply 710. When the electromagnet 654 is powered, it will produce magnetic force and cause the first and second gears 632 and 634 to the positions shown in FIG. 7A. When power is off, the first and second gears 632 and 634 stops movement and stays on the supporting shaft 642. In this position, as shown in FIG. 6, one set of gear/sector is engaged. FIG. 7B depicted another position of the gear set via the magnetic force. In this position, another set of gear/sector may be engaged. Further, a spring connected to vehicle body and refueling door 196 may be adopted to return the refueling door 196 to a closed position as well as function as a damper to regulate an opening speed.

Figure 8A:
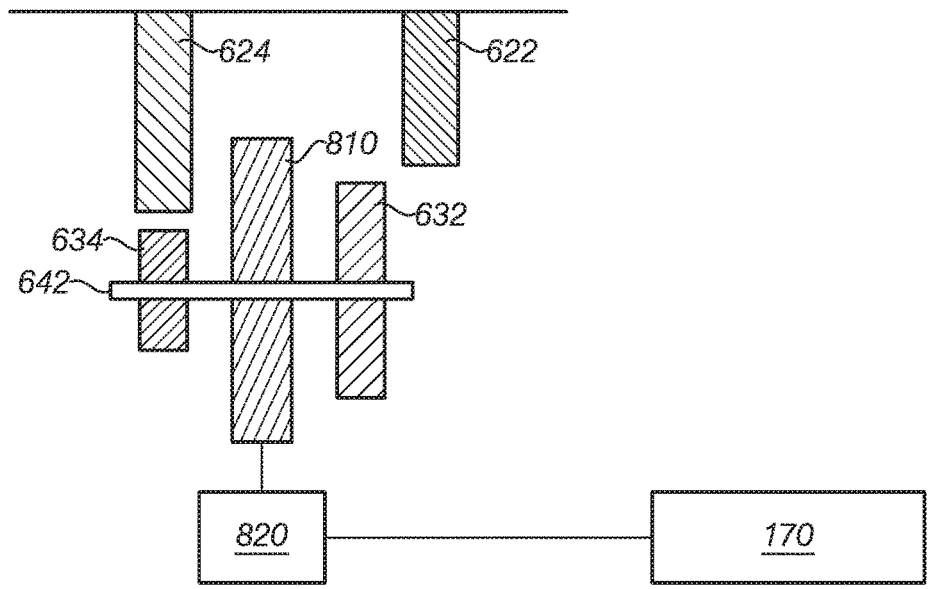
FIG. 8A and FIG. 8B schematically depict another example driving device for the ape mechanism as referenced in FIG. 6, illustrating the driving device at different operation states.
Figure 8B:
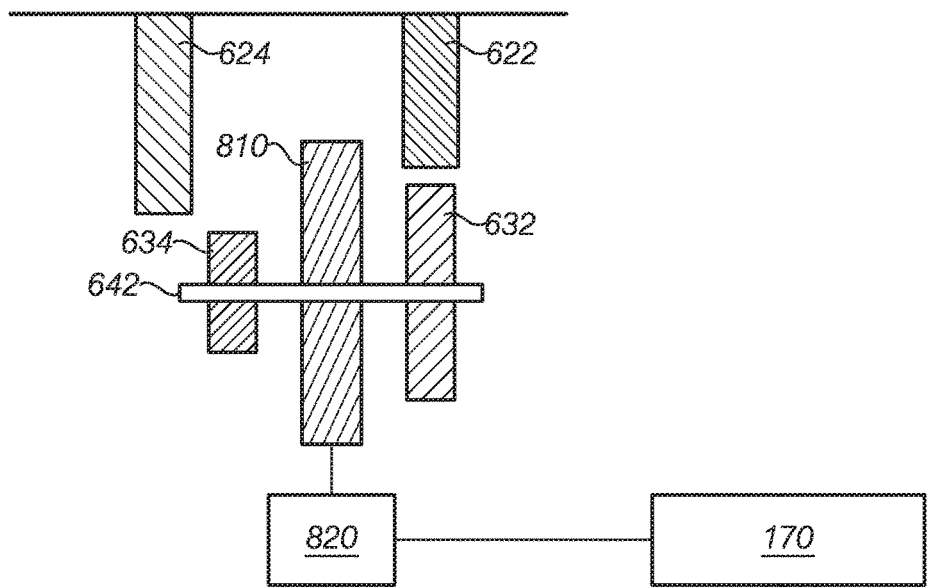

FIGS. 8A and 8B illustratively depict another example embodiment of the driving device 640 in the operating mechanism 600. In this example, the first and second gears 632 and 634 are supported on the supporting shaft 642, while the supporting shaft 642 further includes a driving block 810 locating between the first gear 632 and the second gear 634. The driving block 810 is connected to a driving device 820. The movement of the driving device 820 may be controlled via the control module 170 and further cause the driving block 810 and connected first and second gears 632, 634 to move. As shown in FIG. 8A, the second gear set (634 and 624) is engaged, thereby the slow opening mode may be implemented. As shown in FIG. 8B, the first gear set (632 and 622) is engaged, thereby the fast opening mode may be implemented. It should be appreciated that, the driving device 820 may be executed via electrical/pneumatic/hydraulic devices. The connection may also vary as necessary. In one or more examples, after refueling, user may directly close the refueling door.

Example refueling door opening method and refueling door assembly have been discussed in one or more embodiment with reference to FIG. 1 through FIG. 8B. In one or more examples, a control module is used to start opening the refueling door upon identifying the refueling request. The opening action indicates that the refueling door work properly and thus the user will not repeatedly press the button. Further, as the triggering depressurizing is based on fuel rank vapor pressure and adjusting refueling door opening speed is based on time required for depressurizing, the time to fully open the refueling door is co d. In this way, enough time is provided for depressurizing before a complete opening of refueling door, and thus fuel vapor is prevented from releasing into atmosphere to cause pollution during refueling.

As described herein or elsewhere, the present disclosure provided an optimized refueling door opening method and realization module and mechanism. Though the present disclosure is discussed under the context of vehicles, it could be contemplated that the present disclosure could be applied into other appropriate fields, for instance airplanes, ships etc. Those who skilled in the art will readily recognize from such description, and the accompanying drawings that various changes, modifications and variations can be made therein without departing from the true spirit and fair scope of the invention as defined by the following claims.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method for opening a refueling door of a vehicle, comprising:
   adjusting a speed of opening the refueling door based on a fuel tank vapor pressure P responsive to a detected refueling request.

2. The method of claim 1, further comprising starting to open the refueling door responsive to the detected refueling request, wherein the refueling request is issued by activating an actuator in an interior of the vehicle or an exterior of the vehicle.

3. The method of claim 1, further comprising determining the fuel tank vapor pressure P via estimation or measurement by a sensor.

4. The method of claim 3, further comprising comparing the fuel tank vapor pressure P with a threshold pressure Ps, and instructing to depressurize a fuel tank if the fuel tank vapor pressure P is greater than the threshold pressure Ps.

5. The method of claim 4, wherein depressurizing the fuel tank comprises instructing to open a valve communicating with the fuel tank to release fuel vapor through a predetermined path.

6. The method of claim 3, further comprising comparing the fuel tank vapor pressure P with a threshold pressure Ps, and opening the refueling door at a first speed if the fuel tank vapor pressure P is greater than the threshold pressure Ps, and opening the refueling door at a second speed if the fuel tank vapor pressure P is not greater than the threshold pressure Ps, wherein the first speed is less than the second speed.

7. The method of claim 3, further comprising,
   comparing the fuel tank vapor pressure P and a threshold pressure Ps;
   calculating a time T required to depressurize a fuel tank to a pressure below the threshold pressure Ps if the fuel tank vapor pressure P is greater than the threshold pressure Ps;
   controlling the speed of opening the refueling door so that the refueling door opens completely at a time greater or equals to time T; and
   controlling the speed of opening the refueling door so that the refueling door opens completely at a time Tf if the fuel tank vapor pressure P is less than or equals to the threshold pressure Ps, wherein the time Tf is a predetermined time to completely open the refueling door.

8. The method of claim 3, wherein the vehicle comprising an actuator located on an exterior of the vehicle to unlock the refueling door, the method further comprising:
   comparing the fuel tank vapor pressure P with a threshold pressure Ps;
   calculating a time T1 required to decrease the fuel tank vapor pressure P to below the threshold pressure Ps if the fuel tank vapor pressure P is greater than the threshold pressure Ps;
   calculating a time T2 taken from depressurizing begins to a time when unlocking the refueling door is detected, and controlling the speed of opening the refueling door so that the refueling door opens completely at a time greater or equals to time T1−T2 if T1−T2>=Tf; and
   controlling the speed of opening the refueling door so that the refueling door opens completely at a time greater or equals to time Tf if T1−T2<Tf; wherein the time Tf is a predetermined time for completely opening the refueling door.

9. A refueling door assembly for a vehicle, comprising,
   a fuel tank;
   a refueling inlet to receive a fuel dispensing nozzle;
   a fuel fill line coupled between the fuel tank and the refueling inlet;
   a refueling door located at a vehicle body;
   an operating mechanism connected to the refueling door to open and close the refueling door; and
   a control module configured to open the refueling door responsive to a refueling request and control an opening speed of the operating mechanism based on a fuel tank vapor pressure.

10. The refueling door assembly of claim 9, wherein the refueling request includes refueling request issued from an actuator located on an interior and/or an exterior of the vehicle.

11. The refueling door assembly of claim 9, wherein the operating mechanism comprises a supporting arm, wherein the supporting arm has a first end and a second end, wherein the first end is connected to the refueling door and the second end is pivotably connected to the vehicle body; and a motor drivably connected to the second end.

12. The refueling door assembly of claim 11, wherein the motor comprises an output shaft, and the second end of the supporting arm includes a sleeve operably connected to the output shaft.

13. The refueling door assembly of claim 11, wherein the motor comprises an output gear, and the second end of the supporting arm includes a toothed surface to engage the output gear.

14. The refueling door assembly of claim 9, wherein the operating mechanism comprises a supporting arm, and the supporting arm includes a first end and a second end, wherein the first end is connected with the refueling door, and the second end is pivotably connected to the vehicle body, and the second end includes a first sector and a second sector having different sizes, wherein the operating mechanism further comprises a first gear and a second gear connected to the vehicle body, the first and second gears have different radius and match the first and the second sector, respectively, wherein the first and second gears are further connected to a driving device and are slidably supported on a supporting shaft via the driving device.

15. The refueling door assembly of claim 9, wherein the control module is configured to receive a signal of the fuel tank vapor pressure and to calculate time required to depressurize the fuel tank to a pressure below a threshold.

16. The refueling door assembly of claim 15, wherein the control module is connected to a fuel vapor recovery path and is configured to open a fuel vapor purge valve upon determination that the fuel tank vapor pressure is greater than the threshold and purge fuel vapor to the fuel vapor recovery path, wherein the fuel vapor recovery path comprises a carbon canister.

17. A method to open a refueling door of a fuel tank in a vehicle, comprising:
  determining a fuel vapor pressure P in the fuel tank responsive to a refueling request;
  starting to open the refueling door upon receiving the refueling request; and
  controlling a speed of opening the refueling door based on the fuel vapor pressure P.

18. The method of claim 17, wherein opening the refueling door comprises a fast opening mode and a slow opening mode, the method further comprising comparing the fuel vapor pressure P with a threshold pressure Ps, and executing the slow opening mode to open the refueling door if the fuel vapor pressure P is greater than the threshold pressure Ps; and executing the fast opening mode to open the refueling door is P is not greater than Ps.

19. The method of claim 18, further comprising depressurizing the fuel tank through opening a valve in a fuel vapor recovery path during a process of opening the refueling door.

20. The method of claim 19, wherein the fast and slow opening modes are configured to enable that the fuel tank is depressurized to a predetermined value when the refueling door is opened completely.

* * * * *